US010595702B2

(12) United States Patent
Dries

(10) Patent No.: US 10,595,702 B2
(45) Date of Patent: Mar. 24, 2020

(54) SINGLE DRIVE AXIS MOTOR FOR A DISHWASHER APPLIANCE

(71) Applicant: Haier US Appliance Solutions, Inc., Wilmington, DE (US)

(72) Inventor: John Edward Dries, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 479 days.

(21) Appl. No.: 15/268,676

(22) Filed: Sep. 19, 2016

(65) Prior Publication Data

US 2018/0078112 A1   Mar. 22, 2018

(51) Int. Cl.
| A47L 15/42 | (2006.01) |
| A47L 15/50 | (2006.01) |
| A47L 15/23 | (2006.01) |
| B01D 39/10 | (2006.01) |

(52) U.S. Cl.
CPC .......... A47L 15/4225 (2013.01); A47L 15/23 (2013.01); A47L 15/4206 (2013.01); A47L 15/4221 (2013.01); A47L 15/4293 (2013.01); A47L 15/507 (2013.01); B01D 39/10 (2013.01); Y02B 40/46 (2013.01)

(58) Field of Classification Search
None
See application file for complete search history.

(56) References Cited

U.S. PATENT DOCUMENTS

| 5,972,213 A * | 10/1999 | Golan ............... B01D 29/07 210/186 |
| 8,834,648 B2 | 9/2014 | Fountain |
| 2008/0173338 A1* | 7/2008 | Kim et al. ......... A47L 15/4204 134/186 |
| 2009/0028700 A1* | 1/2009 | Coker ............... A47L 15/4225 415/211.1 |
| 2010/0155326 A1* | 6/2010 | Grunert ............... D06F 58/22 210/507 |
| 2012/0167928 A1* | 7/2012 | Fountain ............ A47L 15/4206 134/111 |
| 2014/0069462 A1* | 3/2014 | Becker ................. A47L 15/22 134/10 |
| 2016/0000296 A1* | 1/2016 | Lee ...................... A47L 15/14 134/182 |

FOREIGN PATENT DOCUMENTS

EP   2058523 A2   5/2009

* cited by examiner

Primary Examiner — Cristi J Tate-Sims
(74) Attorney, Agent, or Firm — Dority & Manning, P.A.

(57) ABSTRACT

A dishwasher appliance is provided having a fluid circulation assembly that uses a single motor and a common drive shaft to rotate both a wash pump impeller and a drain pump impeller. The wash pump impeller and the drain pump impeller are separated by a filter to prevent food soil from being circulated by the wash pump impeller. The common drive shaft passes through an aperture in the filter, the aperture being sealed to prevent the passing of food soil by an inlet guide assembly. The inlet guide assembly includes an upper inlet guide and a lower inlet guide that define a clearance bore and a washer chamber. A washer is positioned in the washer chamber to prevent the flow of food soil through the clearance bore.

20 Claims, 7 Drawing Sheets

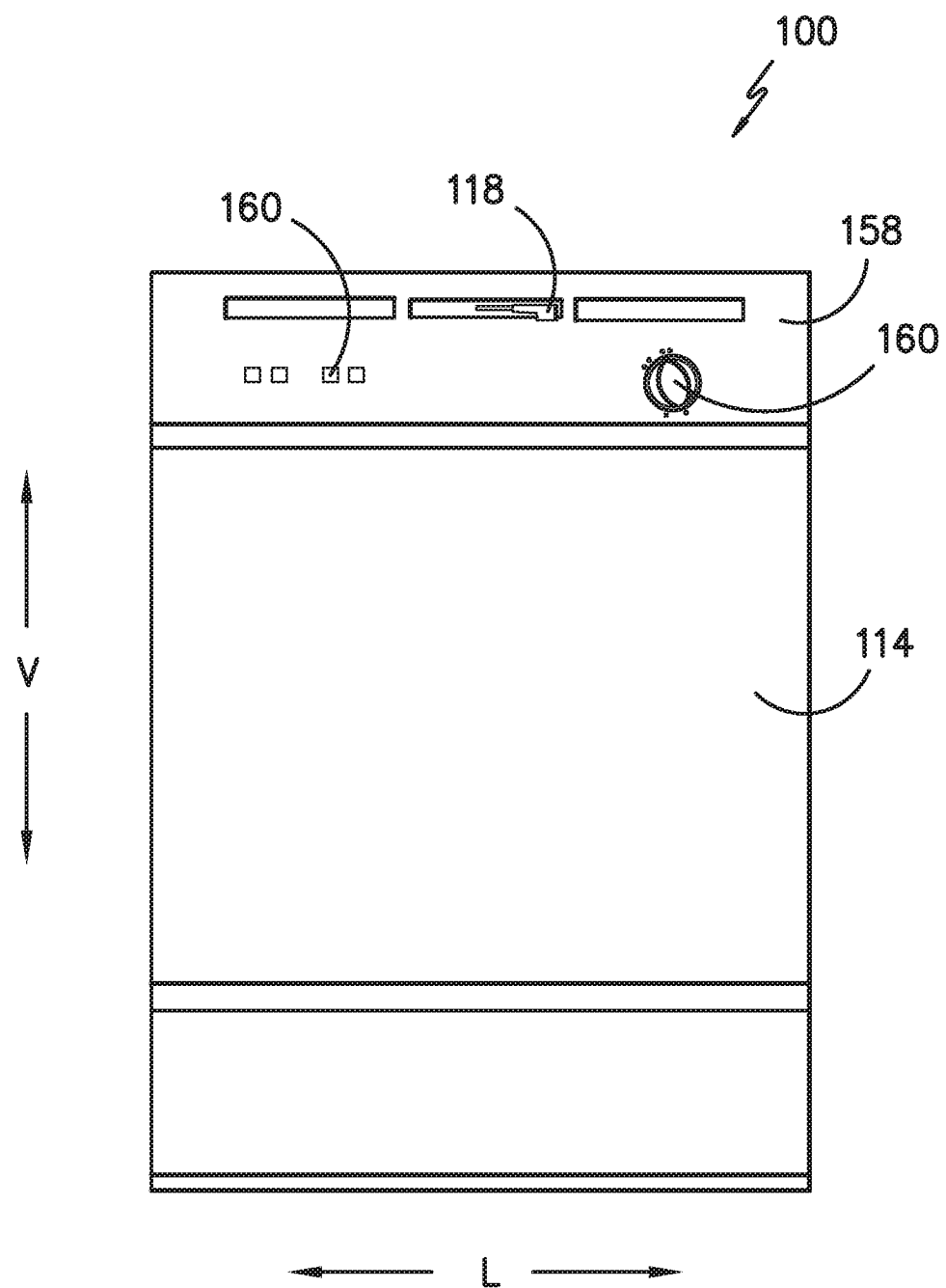
FIG. -1-

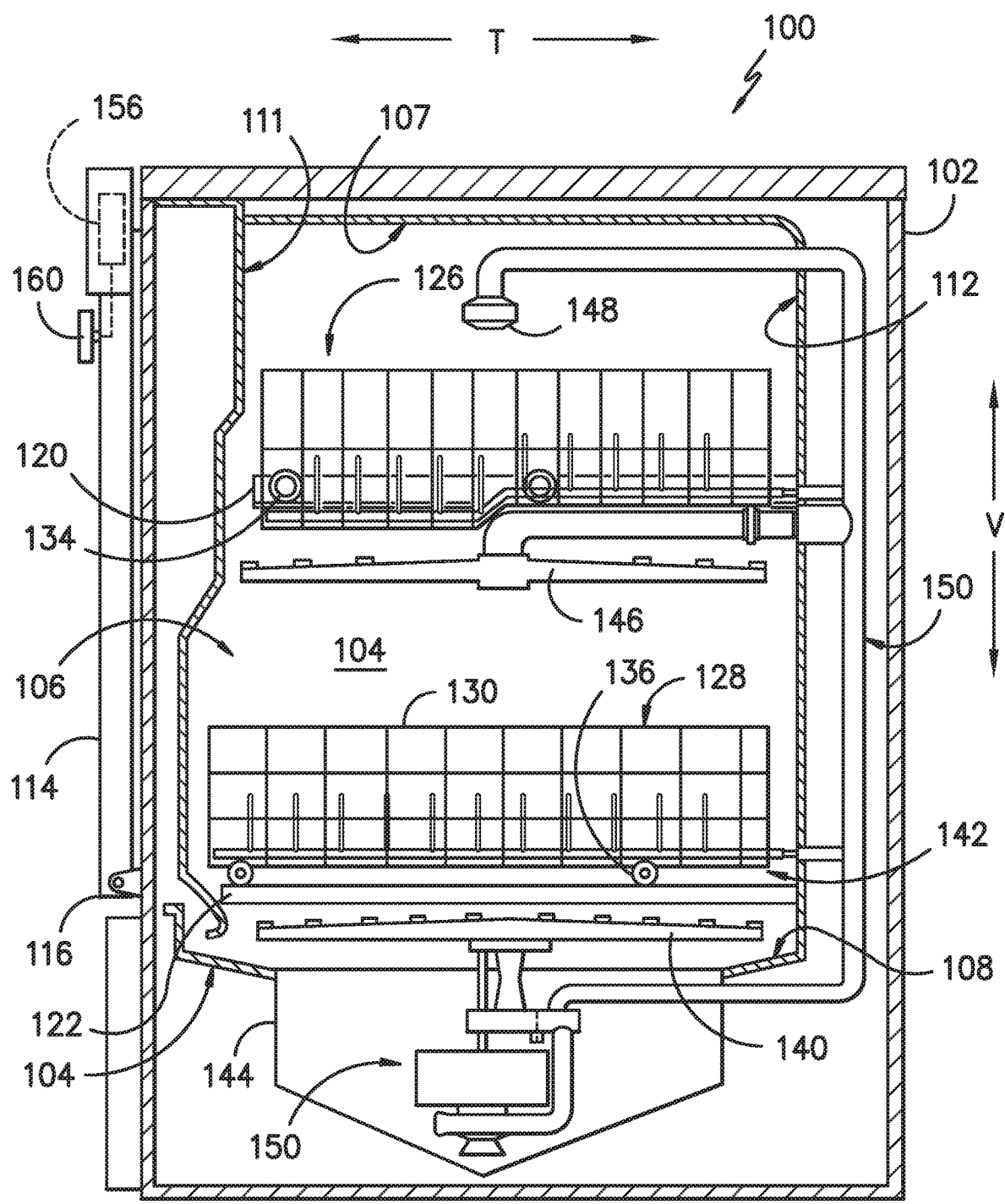
FIG. -2-

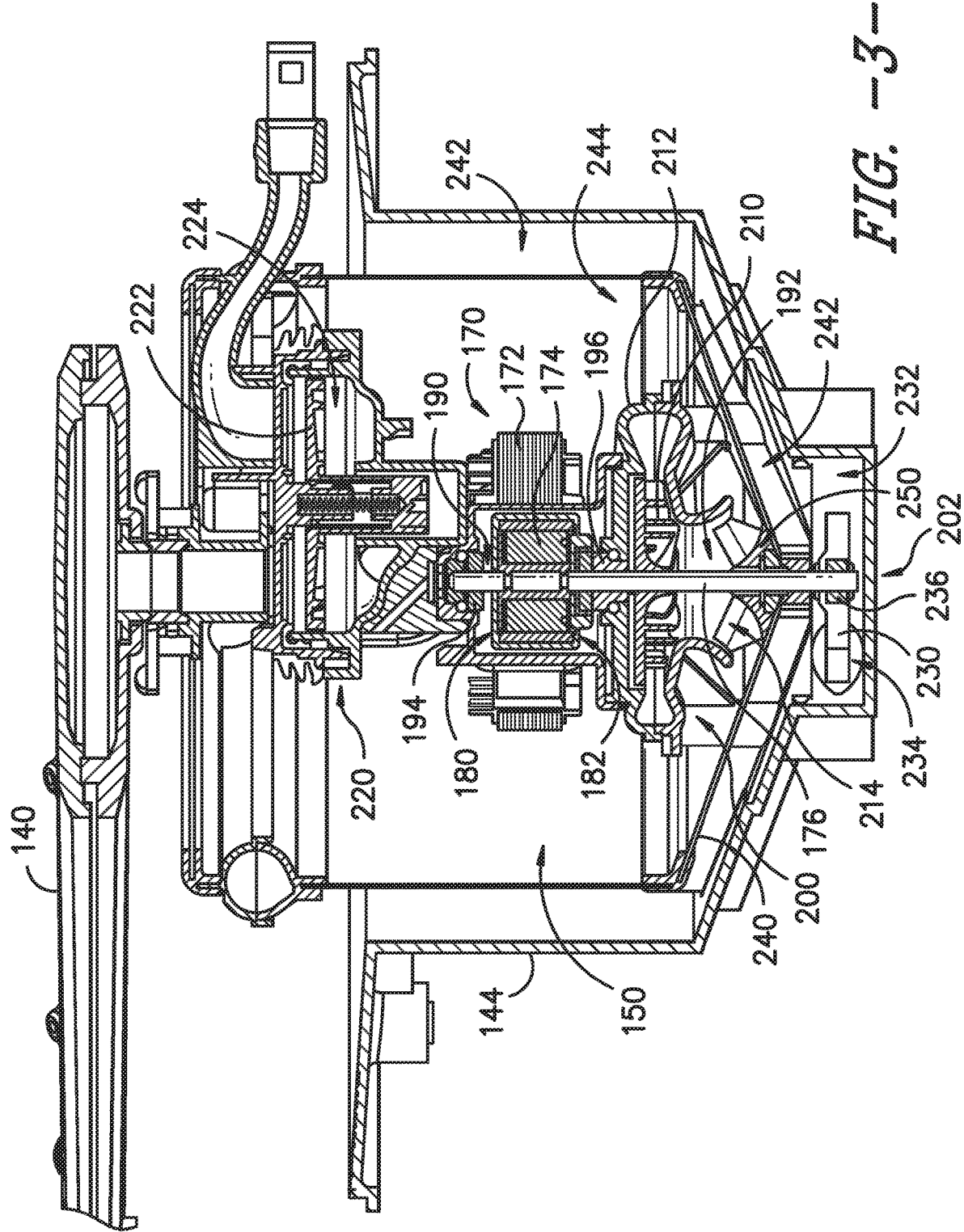
FIG. -3-

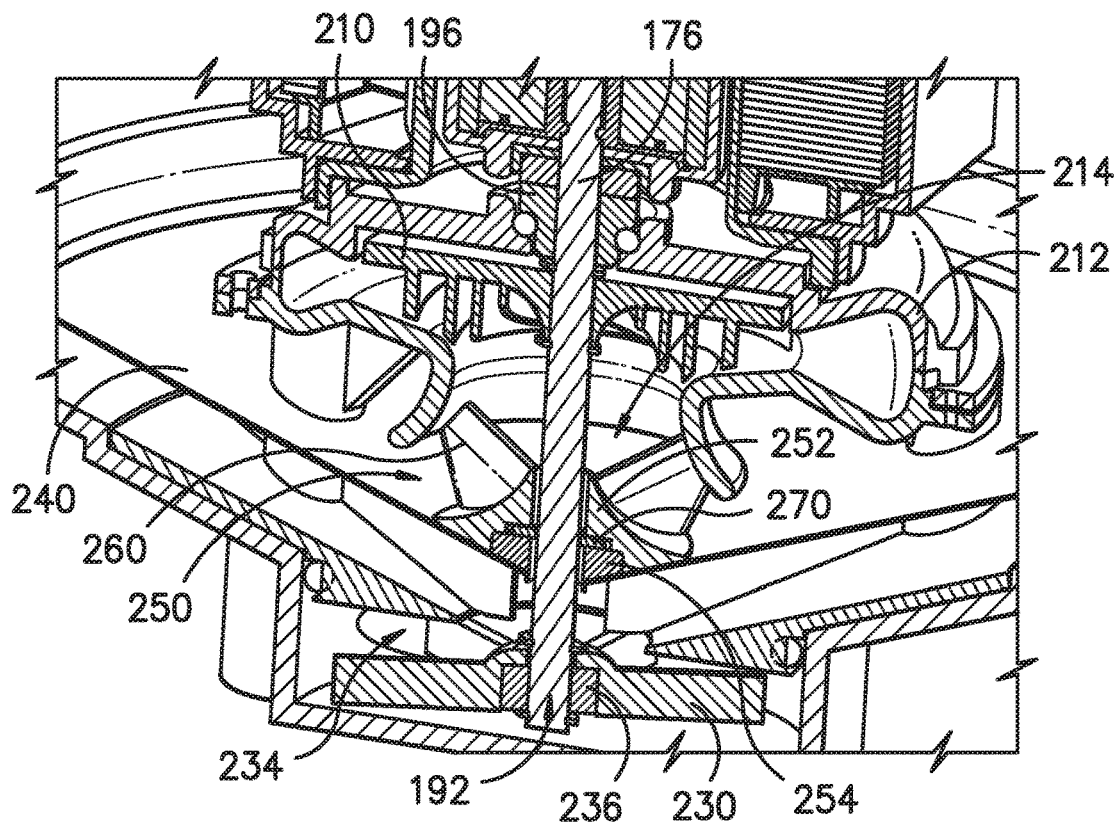
FIG. -4-
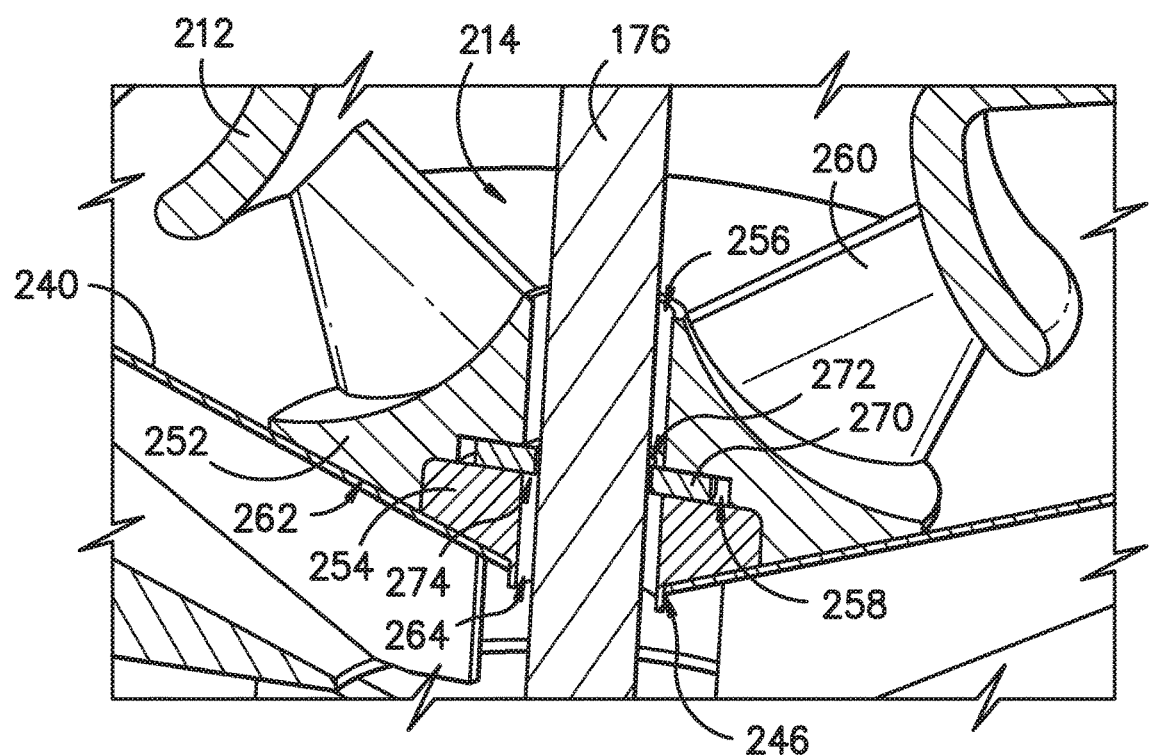
FIG. -5-

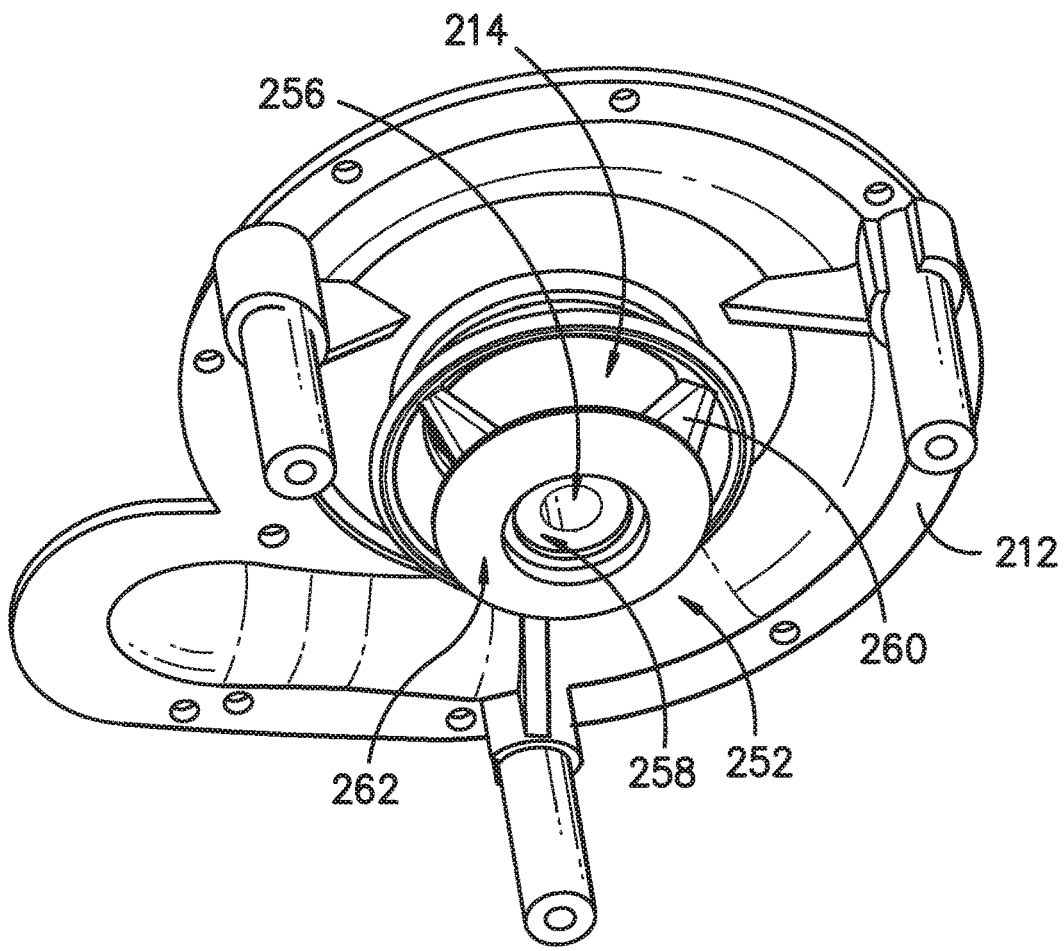
FIG. -6-
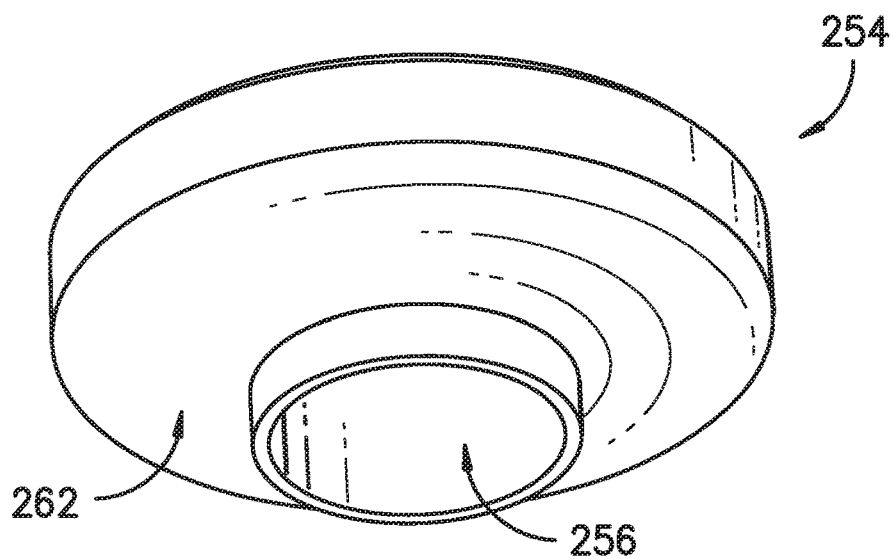
FIG. -7-

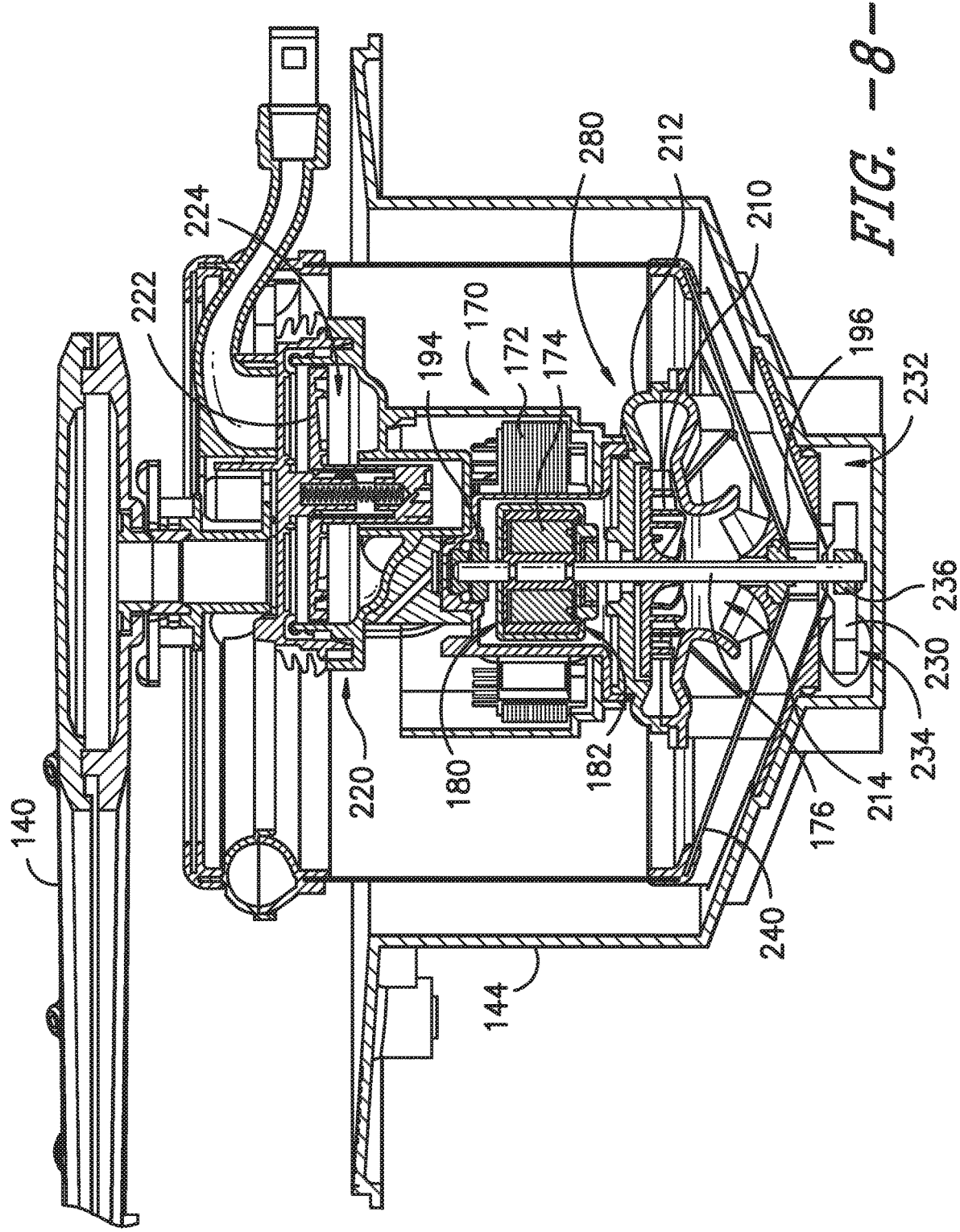
FIG. -8-

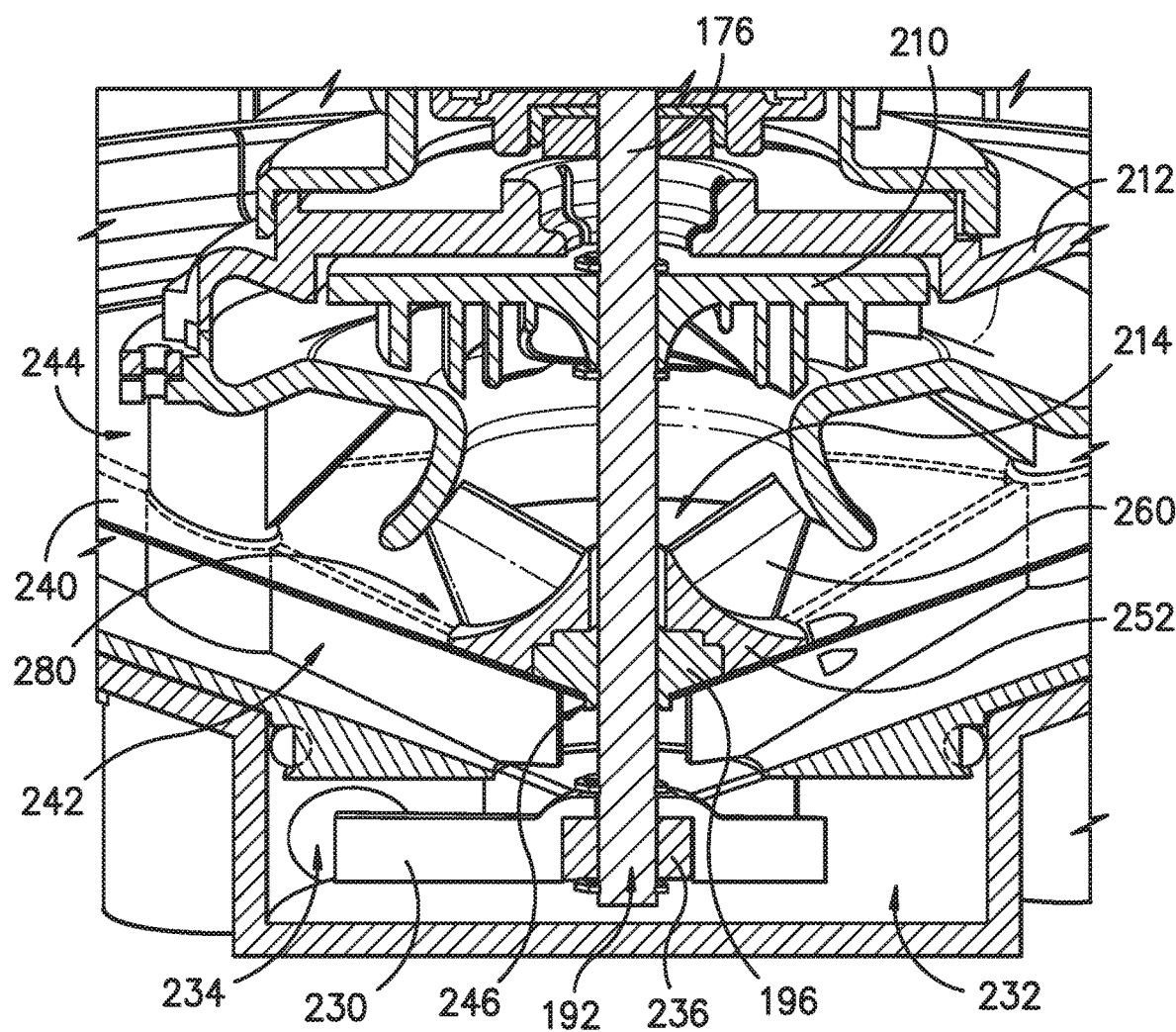
FIG. -9-

SINGLE DRIVE AXIS MOTOR FOR A DISHWASHER APPLIANCE

FIELD OF THE INVENTION

The present disclosure relates generally to dishwasher appliances, and more particularly to an improved fluid circulation assembly for dishwasher appliances.

BACKGROUND OF THE INVENTION

Dishwasher appliances generally include a tub that defines a wash chamber. Rack assemblies can be mounted within the wash chamber of the tub for receipt of articles for washing. Wash fluid (e.g., various combinations of water and detergent along with optional additives) may be introduced into the tub where it collects in a sump space at the bottom of the wash chamber. During wash and rinse cycles, a circulation or wash pump may be used to pump wash fluid to spray assemblies within the wash chamber that can apply or direct wash fluid towards articles disposed within the rack assemblies in order to clean such articles. A drain pump may periodically discharge soiled wash fluid that collects in the sump space and the process may be repeated.

Conventional dishwasher appliances use two separate motors to operate the wash pump and the drain pump. However, additional motors take up more space, add cost, and require additional seals, thus increasing the likelihood of leaks and decreasing appliance reliability. Certain dishwasher appliances have eliminated the need for a second motor by using a single motor and a common drive shaft to rotate a wash pump impeller and a drain pump impeller. However, for a dishwasher appliance which utilizes 100% filtration, i.e., a filtration system in which all of the wash fluid is strained through a filter, the filter typically separates the wash pump impeller and drain pump impeller. As a result, the common drive shaft must pass through the filter, creating a leak path through which food soil and contaminants may pass through the filter.

Accordingly, a dishwasher appliance that utilizes a single motor and common drive shaft to rotate a wash pump and a drain pump while reducing the likelihood of leaks would be useful.

BRIEF DESCRIPTION OF THE INVENTION

The present subject matter provides a dishwasher appliance having a fluid circulation assembly that uses a single motor and a common drive shaft to rotate both a wash pump impeller and a drain pump impeller. The wash pump impeller and the drain pump impeller are separated by a filter to prevent food soil from being circulated by the wash pump impeller. The common drive shaft passes through an aperture in the filter, the aperture being sealed to prevent the passing of food soil by an inlet guide assembly. The inlet guide assembly includes an upper inlet guide and a lower inlet guide that define a clearance bore and a washer chamber. A washer is positioned in the washer chamber to prevent the flow of food soil through the clearance bore. Additional aspects and advantages of the invention will be set forth in part in the following description, may be apparent from the description, or may be learned through practice of the invention.

In accordance with one exemplary embodiment of the present disclosure, a fluid circulation assembly defining a vertical direction is provided. The fluid circulation assembly includes a motor having a top side and a bottom side, and a drive shaft rotatably coupled to the motor, the drive shaft defining an axial direction and a radial direction and having a top portion extending out of the top side of the motor and a bottom portion extending out of the bottom side of the motor. An upper bearing is positioned at and operably coupled with the top portion of the drive shaft and a lower bearing is positioned at and operably coupled with the bottom portion of the drive shaft. A filter defines an aperture, the bottom portion of the drive shaft extending through the aperture. A wash pump impeller is coupled to the bottom portion of the drive shaft above the filter along the vertical direction and a drain pump impeller is coupled to the bottom portion of the drive shaft below the filter along the vertical direction.

In accordance with another exemplary embodiment of the present disclosure, a fluid circulation assembly defining a vertical direction is provided. The fluid circulation assembly includes a motor having a top side and a bottom side, and a drive shaft rotatably coupled to the motor, the drive shaft defining an axial direction and a radial direction and having a top portion extending out of the top side of the motor and a bottom portion extending out of the bottom side of the motor. A filter defines an aperture, the bottom portion of the drive shaft extending through the aperture. An inlet guide assembly is positioned at the aperture of the filter to form a food particle seal with the filter and the drive shaft for preventing food particles from passing through the aperture of the filter. The inlet guide assembly includes an upper inlet guide and a lower inlet guide joined with the upper inlet guide to define a clearance bore extending along the axial direction and a washer chamber. A washer is disposed within the washer chamber such that the bottom portion of the drive shaft passes through the clearance bore, the washer, and the aperture of the filter.

In accordance with yet another exemplary embodiment of the present disclosure, a fluid circulation assembly defining a vertical direction is provided. The fluid circulation assembly includes a motor having a top side and a bottom side, and a drive shaft rotatably coupled to the motor, the drive shaft defining an axial direction and a radial direction and having a top portion extending out of the top side of the motor and a bottom portion extending out of the bottom side of the motor. A filter defines an aperture, the bottom portion of the drive shaft extending through the aperture. An upper bearing is positioned at and operably coupled with the top portion of the drive shaft and a lower bearing is positioned at and operably coupled with the bottom portion of the drive shaft, the lower bearing forming a food particle seal with the filter and the drive shaft for preventing food particles from passing through the aperture of the filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front view of an exemplary embodiment of a dishwashing appliance of the present disclosure.

FIG. 2 provides a side, cross sectional view of the exemplary dishwashing appliance of FIG. 1.

FIG. 3 provides a side, cross sectional view of a fluid circulation assembly according to an example embodiment of the present subject matter.

FIG. 4 provides a perspective, cross sectional view of the fluid circulation assembly of FIG. 3.

FIG. 5 provides a perspective, cross sectional view of an inlet guide assembly of the exemplary fluid circulation assembly of FIG. 3 according to an example embodiment of the present subject matter.

FIG. 6 provides a bottom, perspective view of an upper inlet guide of the exemplary inlet guide assembly of FIG. 5 according to an example embodiment of the present subject matter.

FIG. 7 provides a bottom, perspective view of a lower inlet guide of the exemplary inlet guide assembly of FIG. 5 according to an example embodiment of the present subject matter.

FIG. 8 provides a side, cross sectional view of a fluid circulation assembly according to another example embodiment of the present subject matter.

FIG. 9 provides a side, cross sectional view of a lower bearing of the exemplary fluid circulation assembly of FIG. 8.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "wash fluid" refers to a liquid used for washing and/or rinsing the articles and is typically made up of water that may include other additives such as detergent or other treatments.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown in FIG. 2, the tub extends between a top 107 and a bottom 108 along a vertical direction V, between a first side and a second side along a lateral direction L, and between a front side 111 and a rear side 112 along a transverse direction T. Each of the vertical direction V, lateral direction L, and transverse direction T are mutually perpendicular to one another. The tub 104 includes a front opening (not shown) and a door 114 hinged at its bottom 116 for movement between a normally closed vertical position (shown in FIGS. 1 and 2), wherein the wash chamber 106 is sealed shut for washing operation, and a horizontal open position for loading and unloading of articles from the dishwasher 100. Latch 118 is used to lock and unlock door 114 for access to wash chamber 106.

Upper and lower guide rails 120, 122 are mounted on the first and second sides of tub 104 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by racks 126, 128.

The dishwasher 100 further includes a lower spray arm assembly 140 that will be described in more detail below. Lower spray arm assembly 140 may be disposed in a lower region 142 of the wash chamber 106 and above a tub sump portion 144 so as to rotate in relatively close proximity to rack assembly 128. A mid-level spray arm assembly 146 is located in an upper region of the wash chamber 106 and may be located in close proximity to upper rack 126. Additionally, an upper spray assembly 148 may be located above the upper rack 126. As will be described in detail below, spray arm assemblies 140, 146, 148 may be part of a fluid circulation assembly 150 for circulating water and dishwasher fluid in the tub 104.

Each spray arm assembly 140, 146, 148 includes an arrangement of discharge ports or orifices for directing washing liquid received from fluid circulation assembly 150 onto dishes or other articles located in rack assemblies 126 and 128. The arrangement of the discharge ports, also referred to as jets, apertures, or orifices, may provide a rotational force by virtue of washing fluid flowing through the discharge ports. Alternatively, spray arm assemblies 140, 146, 148 may be motor-driven, as described in detail below. The resultant movement of the spray arm assemblies 140, 146, 148 provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

The dishwasher 100 is further equipped with a controller 156 to regulate operation of the dishwasher 100. The controller 156 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 156 may be positioned in a variety of locations throughout dishwasher 100. In the illustrated embodiment, the controller 156 may be located within a control panel area 158 of door 114 as shown in FIGS. 1 and 2. In such an embodiment, input/output ("I/O") signals may be routed between the control system and various operational components of dishwasher 100 along wiring harnesses that may be routed through the bottom 116 of door 114. Typically, the controller 156 includes a user interface panel/controls 160 through which a user may select various operational features and modes and monitor progress of the dishwasher 100. In one embodiment, the user interface 160 may represent a general purpose I/O ("GPIO") device or functional block. In one embodiment, the user interface 160 may include input components, such as one or more of a variety of electrical, mechanical or electro-mechanical input devices including rotary dials, push buttons, and touch pads. The user interface 160 may include a display component, such as a digital or analog display device designed to provide operational feedback to a user. The user interface 160 may be in communication with the controller 156 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 160, different configurations may be provided for racks 126, 128, different spray arm assemblies 140, 146, 148 may be used, and other differences may be applied as well.

Referring now generally to FIGS. 3 through 7, a fluid circulation assembly 150 according to an example embodiment of the present subject matter will be described. Fluid circulation assembly 150 may include a drive motor 170 that may be disposed within sump portion 144 of tub 104 and may be configured to rotate multiple components of dishwasher 100. As best shown in FIG. 3, drive motor 170 may be, for example, a brushless DC motor having a stator 172, a rotor 174, and a drive shaft 176 attached to rotor 174. A controller or control board (not shown) may control the speed of motor 170 and rotation of drive shaft 176 by selectively applying electric current to stator 172 to cause rotor 174 and drive shaft 176 to rotate. Although drive motor 170 is illustrated herein as a brushless DC motor, it should be appreciated that any suitable motor may be used while remaining within the scope of the present subject matter. For example, according to alternative embodiments, drive motor 170 may instead be a synchronous induction motor.

According to an exemplary embodiment, drive motor 170 and all its components may be potted. In this manner, drive motor 170 may be shock-resistant, submersible, and generally more reliable. Notably, because drive motor 170 is mounted inside wash chamber 106 and is completely submersible, no seals are required and the likelihood of leaks is reduced. In addition, because drive motor 170 is mounted in the normally unused space between lower spray arm 140 and a bottom wall of sump portion 144, instead of beneath the sump portion 144, this design is inherently more compact than conventional designs.

According to an exemplary embodiment, fluid circulation assembly 150 may be vertically mounted within sump portion 144 of wash chamber 106. More particularly, drive motor 170 of fluid circulation assembly 150 may be mounted such that drive shaft 176 is oriented along vertical direction V (FIG. 2) of dishwasher 100. More particularly, drive shaft 176 may define an axial direction A and a radial direction R, with the axial direction A being parallel to the vertical direction V of the dishwasher 100. So oriented, drive motor 170 may include a top side 180 facing top 107 of tub 104 and a bottom side 182 facing bottom 108 of tub 104.

As best shown in FIG. 3 and described below, rotatable drive shaft 176 may extend out both top 180 and bottom 182 of motor 176. More particularly, a top portion 190 of drive shaft 176 may extend out of top 180 of motor 170 toward top 107 of tub 104 and a bottom portion 192 of drive shaft 176 may extend out of bottom 182 of motor 170 toward bottom 108 of tub 104. Notably, top portion 190 and bottom portion 192 may be part of the same, continuous, straight drive shaft 176 and thus rotate at the same speed.

Referring still to FIG. 3, drive shaft 176 is rotatably supported by an upper bearing 194 and a lower bearing 196. As illustrated, upper bearing 194 is positioned at and operably coupled with top portion 190 of drive shaft 176 and lower bearing 196 is positioned at and operably coupled with bottom portion 192 of drive shaft 176. As illustrated, bearings 194, 196 are graphite sleeve bearings. However, it should be appreciated that any suitable bearing may be used while remaining within the scope of the present subject matter. For example, bearings 194, 196 may be any suitable combination of roller bearings, ball bearings, thrust bearings, bush bearings, etc.

Still referring to FIG. 3, bottom portion 192 of drive shaft 176 is configured for driving a circulation or wash pump assembly 200 and a drain pump assembly 202. Wash pump assembly 200 may generally be configured for circulating wash fluid within wash chamber 106 during wash and/or rinse cycles. Drain pump assembly 202 may generally be configured for periodically discharging soiled wash from dishwasher 100. Each of these assemblies will be described in more detail below.

According to an exemplary embodiment, wash pump assembly 200 may be configured to provide wash fluid to spray arm assemblies 140, 146, 148. More specifically, wash pump assembly 200 may include a wash pump impeller 210 disposed on bottom portion 192 of drive shaft 176 within a pump housing 212. Pump housing 212 defines a pump intake 214 for drawing wash fluid into wash pump impeller 210. According to the illustrated embodiment, pump intake 214 is facing downward along the vertical direction V and is located very near the bottom of sump portion 144. In this manner, the amount of water required to prime and operate wash pump assembly 200 is minimized. This is particularly advantageous when running low water cycles for the purpose of water and energy savings.

In operation, wash pump impeller 210 draws wash fluid in from sump portion 144 and pumps it to a diverter assembly 220. Diverter assembly 220 may include a diverter disc 222 disposed within a diverter chamber 224 for selectively distributing the wash fluid to the spray arm assemblies 140, 146, 148. More particularly, diverter disc 222 may be rotatably mounted about the vertical direction V. Diverter disc 222 may have a plurality of apertures that are configured to align with a one or more outlet ports at the top of diverter chamber 224.

In addition, drain pump assembly 200 may be configured for discharging soiled wash fluid from the dishwasher 100 periodically. More specifically, drain pump assembly 202 may include a drain pump impeller 230 disposed on bottom portion 192 of drive shaft 176 within a drain pump volute 232. Drain pump volute 232 is positioned at the very bottom of sump portion 144, such that wash fluid collects within drain pump volute 232. During a drain cycle, drain pump impeller is rotated and soiled wash fluid is discharged from dishwasher 100 through a discharge conduit 234. After some or all of the soiled wash fluid is discharged, fresh water and/or wash additives may be added and the wash or rinse cycle may be repeated. Notably, drain pump impeller 230 is coupled to bottom portion 192 of drive shaft 176 using a one-way clutch 236. In this regard, during a wash pump mode, drive motor 170 rotates in one direction, pumping filtered wash fluid using wash pump impeller 210. However, one-way clutch 236 is disengaged, so drain pump impeller 230 does not rotate. By contrast, during a drain pump mode, drive motor 170 rotates in the opposite direction, thereby engaging one-way clutch 236 and causing drain pump impeller 230 to rotate and discharge wash fluid.

As illustrated in FIG. 3, fluid circulation assembly 150 further includes a filter 240. In general, filter 240 may define an unfiltered region 242 and a filtered region 244 within sump portion 144. During a wash or rinse cycle, wash fluid sprayed on dishes or other articles within wash chamber 106 falls into the unfiltered region 242. Wash fluid passes through filter 240 which removes food particles, resulting in relatively clean wash fluid within filtered region 244. As used herein, "food particles" refers to food soil, particles, sediment, or other contaminants in the wash fluid which are not intended to travel through filter 240. Thus, a food particle seal may allow water or other wash fluids to pass from the unfiltered region 242 to the filtered region 244 while preventing food particles entrained within that wash fluid from passing along with the wash fluid.

As illustrated, filter 240 is a cylindrical and conical fine mesh filter constructed from a perforated stainless steel plate. Filter 240 may include a plurality of perforated holes, e.g., approximately 15/1000 of an inch in diameter, such that wash fluid may pass through filter 240, but food particles entrained in the wash fluid do not pass through filter 240. However, according to alternative embodiments, filter 240 may be any structure suitable for filtering food particles from wash fluid passing through filter 240. For example, filter 240 may be constructed from any suitably rigid material, may be formed into any suitable shape, and may include apertures of any suitable size for capturing particulates.

According to the illustrated embodiment, filter 240 defines an aperture 246 through which bottom portion 192 of drive shaft 176 extends. Wash pump impeller 210 is coupled to bottom portion 192 of drive shaft 176 above filter 240 and drain pump impeller 230 is coupled to bottom portion 192 of drive shaft 176 below filter 240 along the vertical direction V. Notably, as illustrated in FIG. 3, lower bearing 196 is positioned above both wash pump impeller 210 and drain pump impeller 230 along the vertical direction V. In this manner, bottom portion 192 of drive shaft 176 is cantilevered and supports impellers 210, 230. Fluid circulation assembly 150 may further include an inlet guide assembly 250 which is configured for accurately locating and securing filter 240 while allowing drive shaft 176 to pass through aperture 246, as described below.

Referring now specifically to FIGS. 4 through 7, inlet guide assembly 250 will be described according to an exemplary embodiment of the present subject matter. In general, inlet guide assembly 250 is configured for sealing filter 240 where drive shaft 176 passes through aperture 246 to prevent food particles from bypassing filter 240. In addition, inlet guide assembly 250 serves to secure filter 240 and to define an inlet region of pump intake 214.

According to the illustrated embodiment, inlet guide assembly 250 includes an upper inlet guide 252 and a lower inlet guide 254. Upper inlet guide 252 may be joined with lower inlet guide 254 to define a clearance bore 256 extending along the axial direction A and a washer chamber 258. Upper inlet guide 252 may also include one or more support arms 260 that extend between upper inlet guide 252 and pump housing 212. Support arms 260 may be configured for guiding wash fluid into pump intake 214 and for firmly engaging inlet guide assembly 250 with filter 240.

As best illustrated in FIG. 5, drive shaft 176 passes through clearance bore 256, washer chamber 258, and aperture 246 between unfiltered region 242 and filtered region 244 of sump portion 144. A bottom surface 262 of inlet guide assembly 250 is firmly in contact with filter 240 and thus provides no path for wash fluid and food particles to pass between bottom surface 262 and filter 240. However, clearance bore 256 has a diameter that is larger than the diameter of drive shaft 176, thereby defining an annular space 264 through which food particles may pass. Thus, in order to prevent food particles from passes through clearance bore 256 into the filtered region 244 of sump portion 144, inlet guide assembly 250 may further include a washer 270 disposed within washer chamber 258.

As illustrated, washer 270 defines a washer aperture 272 through which drive shaft 176 passes. Notably, washer aperture 272 defines a diameter that is smaller than the diameter of clearance bore 256. In this regard, an annular gap 274 may be defined between drive shaft 176 and washer 270 along the radial direction R. The size of annular gap 274 is sufficiently small such that no food particles may pass through. For example, the size of annular gap 274 may be equal to or less than the size of the perforated holes in filter 240. For example, the size of annular gap 274 may be less than one-tenth of an inch or may be approximately 16/1000 of an inch. It should be appreciated, that as used herein, terms of approximation, such as "about" or "approximately," refer to being within a 10% margin of error.

According to the illustrated embodiment, washer 270 is in contact with both upper inlet guide 252 and lower inlet guide 254 along the axial direction A. In addition, washer chamber 258 defines a chamber diameter and washer 270 defines an outer washer diameter, the chamber diameter being larger than the outer washer diameter along the radial direction R. In this regard, washer 270 may move within washer chamber 258 along the radial direction R, e.g., in order to accommodate minor drive shaft wobble or misalignment while retaining a particle tight seal. According to the illustrated embodiment, washer 270 is constructed of Teflon®. However, it should be appreciated that washer 270 may be constructed of any suitable rigid and low friction material, such as graphite.

Referring now to FIGS. 8 and 9, a fluid circulation assembly 280 in accordance with another exemplary embodiment of the present disclosure is depicted. The exemplary fluid circulation assembly 280 depicted in FIGS. 8 and 9 may be configured in substantially the same manner as exemplary fluid circulation assembly 150 depicted in FIGS. 3 through 7 and described above. Accordingly, the same or similar numbering may refer to the same or similar part.

As illustrated, fluid circulation assembly 280 replaces lower inlet guide 254 and washer 270, as described above, with lower bearing 196. More specifically, lower bearing 196 is positioned below wash pump impeller 210 at aperture 246 of filter 240 and is configured for rotatably supporting bottom portion 192 of drive shaft 176 while at the same time sealing aperture 246 in the same manner described above. In this regard, lower bearing 196 may be configured to prevent vibration and wobbling of cantilevered bottom portion 192 of drive shaft 176. In such an embodiment, the total number of components may be reduced, assembly may be simplified, and the size of the gap between drive shaft 176 and lower bearing 196 may be smaller than annular gap 274 described above due to the inherent tolerances of lower bearing 196.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fluid circulation assembly defining a vertical direction and comprising:
   a motor having a top side and a bottom side;
   a drive shaft rotatably coupled to the motor, the drive shaft defining an axial direction and a radial direction and having a top portion extending out of the top side of the motor and a bottom portion extending out of the bottom side of the motor;
   an upper bearing positioned at and operably coupled with the top portion of the drive shaft;
   a lower bearing positioned at and operably coupled with the bottom portion of the drive shaft;
   a filter defining an aperture, the bottom portion of the drive shaft extending through the aperture;
   a wash pump impeller coupled to the bottom portion of the drive shaft above the filter along the vertical direction; and
   a drain pump impeller coupled to the bottom portion of the drive shaft below the filter along the vertical direction.

2. The fluid circulation assembly of claim 1, wherein the lower bearing is positioned above both the wash pump impeller and the drain pump impeller along the vertical direction.

3. The fluid circulation assembly of claim 1, wherein the filter divides a sump into a filtered region and an unfiltered region and the fluid circulation assembly further comprises an inlet guide assembly, the inlet guide assembly being positioned at least partially through the aperture of the filter comprising:
   an upper inlet guide;
   a lower inlet guide joined with the upper inlet guide to define a clearance bore extending along the axial direction and a washer chamber; and
   a washer disposed within the washer chamber such that the bottom portion of the drive shaft passes through the clearance bore, the washer, and the aperture of the filter,
   wherein the inlet guide assembly forms a food particle seal with the filter and the drive shaft for preventing food particles from passing through the aperture of the filter.

4. The fluid circulation assembly of claim 3, wherein a gap is defined between the drive shaft and the washer along the radial direction, the gap being less than about one-tenth of an inch.

5. The fluid circulation assembly of claim 3, wherein the washer is in contact with the upper inlet guide and the lower inlet guide along the axial direction.

6. The fluid circulation assembly of claim 3, wherein the washer chamber defines a chamber diameter and the washer defines a washer diameter, the chamber diameter being larger than the washer diameter such that the washer may move within the washer chamber along the radial direction.

7. The fluid circulation assembly of claim 3, wherein the washer is constructed of Teflon®.

8. The fluid circulation assembly of claim 1, wherein the lower bearing is positioned below the wash pump impeller at the aperture of the filter.

9. The fluid circulation assembly of claim 1, wherein the drain pump impeller is positioned at a bottom of a sump area of a dishwasher.

10. The fluid circulation assembly of claim 1, wherein the filter is constructed of perforated stainless steel.

11. The fluid circulation assembly of claim 1, wherein the motor is vertically oriented within a sump area of a dishwasher, such that the drive shaft is vertically oriented relative to the dishwasher.

12. A fluid circulation assembly defining a vertical direction and comprising:
   a motor having a top side and a bottom side;
   a drive shaft rotatably coupled to the motor, the drive shaft defining an axial direction and a radial direction and having a top portion extending out of the top side of the motor and a bottom portion extending out of the bottom side of the motor;
   a filter dividing a sump into a filtered region and an unfiltered region and defining an aperture, the bottom portion of the drive shaft extending through the aperture; and
   an inlet guide assembly being positioned at least partially through the aperture of the filter to form a food particle seal with the filter and the drive shaft for preventing food particles from passing through the aperture of the filter, the inlet guide assembly comprising:
      an upper inlet guide;
      a lower inlet guide joined with the upper inlet guide to define a clearance bore extending along the axial direction and a washer chamber; and
      a washer disposed within the washer chamber such that the bottom portion of the drive shaft passes through the clearance bore, the washer, and the aperture of the filter.

13. The fluid circulation assembly of claim 12, further comprising:
   an upper bearing positioned at and operably coupled with the top portion of the drive shaft;
   a lower bearing positioned at and operably coupled with the bottom portion of the drive shaft;
   a wash pump impeller coupled to the bottom portion of the drive shaft above the filter along the vertical direction; and
   a drain pump impeller coupled to the bottom portion of the drive shaft below the filter along the vertical direction.

14. The fluid circulation assembly of claim 12, wherein the lower bearing is positioned above both the wash pump impeller and the drain pump impeller along the vertical direction.

15. The fluid circulation assembly of claim 12, wherein a gap is defined between the drive shaft and the washer along the radial direction, the gap being less than about one-tenth of an inch.

16. The fluid circulation assembly of claim 12, wherein the washer is in contact with the upper inlet guide and the lower inlet guide along the axial direction.

17. The fluid circulation assembly of claim 12, wherein the washer chamber defines a chamber diameter and the washer defines a washer diameter, the chamber diameter being larger than the washer diameter such that the washer may move within washer chamber along the radial direction.

18. A fluid circulation assembly defining a vertical direction and comprising:
- a motor having a top side and a bottom side;
- a drive shaft rotatably coupled to the motor, the drive shaft defining an axial direction and a radial direction and having a top portion extending out of the top side of the motor and a bottom portion extending out of the bottom side of the motor;
- a filter dividing a sump into a filtered region and an unfiltered region and defining an aperture, the bottom portion of the drive shaft extending through the aperture;
- an upper bearing positioned at and operably coupled with the top portion of the drive shaft; and
- a lower bearing positioned at and operably coupled with the bottom portion of the drive shaft, the lower bearing forming a food particle seal with the filter and the drive shaft for preventing food particles from passing through the aperture of the filter.

19. The fluid circulation assembly of claim 18, further comprising:
- a wash pump impeller coupled to the bottom portion of the drive shaft above the lower bearing along the vertical direction; and
- a drain pump impeller coupled to the bottom portion of the drive shaft below the filter along the vertical direction.

20. The fluid circulation assembly of claim 18, wherein the motor is vertically oriented within a sump area of a dishwasher, such that the drive shaft is vertically oriented relative to the dishwasher.

\* \* \* \* \*